United States Patent [19]

Mizutani

[11] Patent Number: 4,656,523
[45] Date of Patent: Apr. 7, 1987

[54] TWO DIMENSIONAL CODING APPARATUS
[75] Inventor: Motoharu Mizutani, Tokyo, Japan
[73] Assignee: Kabushiki Kaisha Toshiba, Kawasaki, Japan
[21] Appl. No.: 698,875
[22] Filed: Feb. 6, 1985
[30] Foreign Application Priority Data
  Feb. 13, 1984 [JP] Japan .................... 59-24573
[51] Int. Cl.$^4$ ............................ H04N 1/415
[52] U.S. Cl. .................... 358/260; 358/280; 358/284
[58] Field of Search ............ 358/260, 280, 284, 261; 371/22, 25, 32

[56] References Cited
U.S. PATENT DOCUMENTS
4,091,424 5/1978 Widergren ............... 358/260
4,293,920 10/1981 Merola ................. 358/260

Primary Examiner—Michael A. Masinick
Attorney, Agent, or Firm—Cushman, Darby and Cushman

[57] ABSTRACT

A two dimensional coding apparatus in use with a facsimile for two dimensionally coding an image signal, comprises an image memory for storing an image signal and a two dimensional coder for the modified READ coding the image signal in the image memory for each block having a predetermined number of scanning lines. A code signal output from the two dimensional coder is transmitted to a decoder through a transmission line. When a transmission error code is detected by a decoder, the code signal of that block containing the error is retransmitted. A K factor generator selects the block size (K factor) of the two dimensional coder to be optimum according to an error rate, so as to minimize a bit length of the whole transmitted code signals including the retransmitted code signal.

8 Claims, 4 Drawing Figures

TWO DIMENSIONAL CODING APPARATUS

BACKGROUND OF THE INVENTION

The present invention relates to an apparatus for two dimensionally coding an image signal.

In an image signal processing system, such as facsimile or an image signal filing system using an optical disc, a picture is composed of a great many picture elements. These picture elements are sorted into black and white to obtain a binary image signal. To reduce the amount of the image signal to be processed, the binary image signal is subjected to coding for reducing the redundancy in the image signal. The redundancy reduction coding is based on the nature of the picture and its correlated image signal. A typical example of the coding is a modified READ coding system, which has been employed in a so-called high speed Group III Standard facsimile. This coding system is a two dimensional successive coding system constructed on the basis of the correlated image signal in both vertical and horizontal directions of the picture. Specifically, in this coding system, the coding is based on positions of picture elements where their density (black or white) changes. In other words, what is coded is not the picture elements per se, but the position data of the picture elements. In the image signal processing system based on the modified READ coding, if there is an error in a code signal during transmission, the influence of the transmission error is successively propagated to the successive scanning lines (horizontal scanning lines). To stop the propagation of the transmission error, the two dimensional coding operation is ceased at every K scanning line, and one dimensional coding (modified Huffman coding) is executed in place of the former coding. The interval between the executions of the modified Huffman coding is defined as the K factor. The K factor is a parameter which must be selected by a designer in the modified READ coding. The modified Huffman coding system is a specific form of the modified READ system, viz., the modified READ system where K=1. Therefore, as the K factor is large, a coding rate (a ratio of the number of bits of an image signal to that of a code signal) is higher in the two dimensional coding system. Actually, the transmission line inevitably contains a predetermined error rate. Therefore, as a coding block (K scanning line) is larger, the code error contained in the code signals of one block transmitted is larger. In Group III Standard, when the code error is detected, the code signal with the code error is not retransmitted. For this reason, in the modified READ system employed in the Group III Standard facsimile, there is a limit to increasing the K factor when the code error caused during the transmission is considered. At present, the K factor is fixed at 2 in a standard resolution mode, and at 4 in a high resolution mode.

Also, when the code signal with the code error is retransmitted, the K factor cannot be made large. Generally, the retransmission is performed at every block. Then, when the K factor is too large, even if the code error is small, the number of bits of the code signal to be retransmitted is large, resulting in reduction of the virtual coding rate. The term "virtual coding rate" means the ratio of the number of bits of an image signal to that of the whole transmitted code signals, including the retransmitted signals, and is called "reduction rate" in this specification.

As described above, in the conventional two dimensional coding system, the K factor is fixed at a small value, depending on the error rate of the transmission line and/or the type of a transmission system. In the recent communication cable which has been modified and made more complicated, it is impossible to make the redundancy reduction rate large with such a small value for the K factor.

Similar problems with facsimile are also true for an image signal processing system such as the image signal filing system. That is, in the image signal filing system, if the code error in transmission is replaced by the writing error at the time of data writing in an optical disc, the image signal filing system has the same problems as those in facsimile.

SUMMARY OF THE INVENTION

Accordingly, an object of the present invention is to provide a two dimensional coding apparatus for use in an image signal processing system such as facsimile or an image signal filing system, where the apparatus can effectively reduce and code the image signal so as to minimize the amount of data to be processed.

To achieve the above object, a two dimensional coding apparatus is provided comprising: means for two dimensionally coding an image signal for each predetermined block in a successive manner, code processing means for transmitting or storing the code signal output from the coding means, means for detecting an error code in the code signal during transmission or storing by the code processing means, means for retransmitting or restoring a code signal including an error code according to an output of the detecting means, and means for selecting a block size for the coding means according to an error rate of the code processing means.

DETAILED DESCRIPTION OF THE PREFERRED EMBODIMENTS

Figure 1:
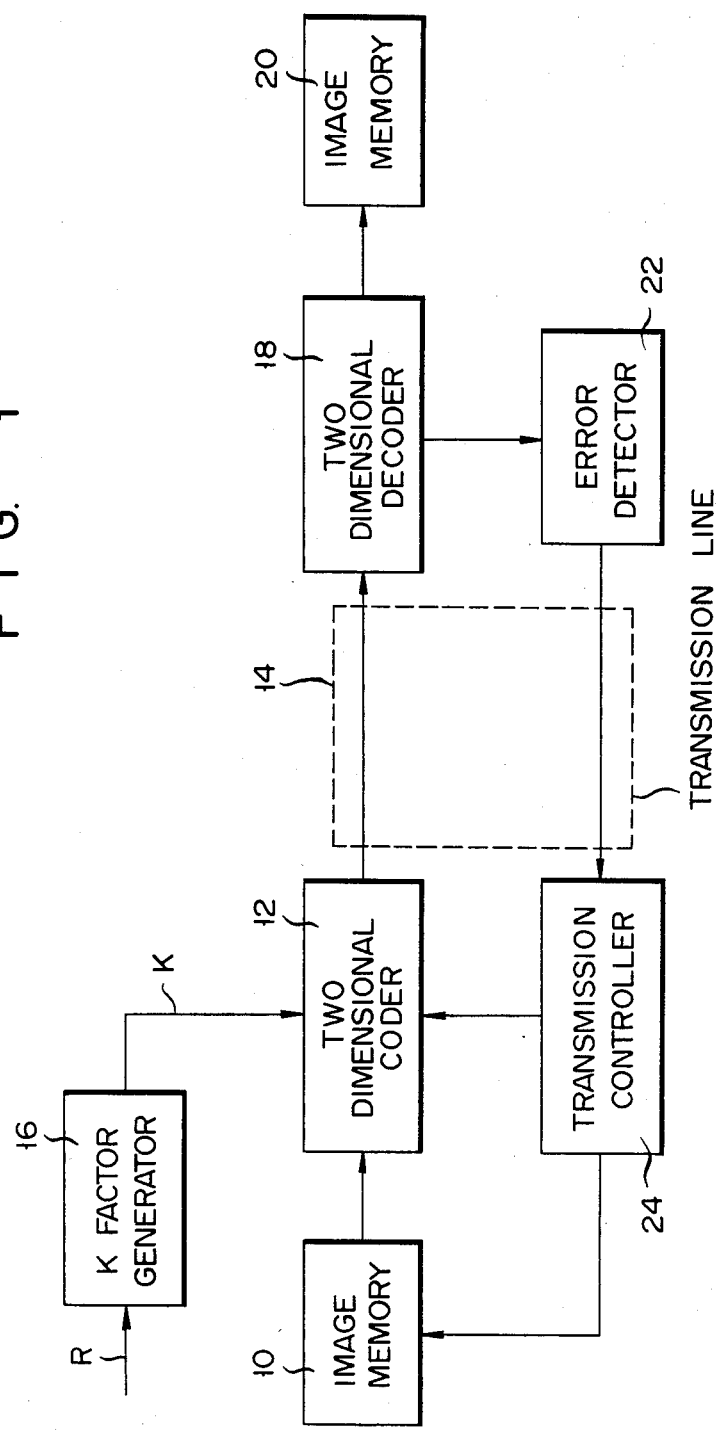
FIG. 1 is a block diagram of an embodiment of a two dimensional coding apparatus according to the present invention, where the apparatus is used with a facsimile system.

Preferred embodiments of a two dimensional coding apparatus according to the present invention will be described while referring to the accompanying drawings. In the first embodiment, a two dimensional coding apparatus according to the present invention is being used with a facsimile system. FIG. 1 shows a block diagram of the first embodiment in which an image signal is transmitted from one facsimile unit to another. An image signal representing a picture on a document is read out by a photo-electric converting section or a line sensor (not shown) and is stored into image memory 10 (on the transmitting side). The image signal is a binary signal representing black and white picture elements. The image signal read out from the image memory 10 is supplied to a two dimensional coder 12. The two dimensional coder 12 codes the image signal by modified READ conversion for each block as defined by the K factor, and transmits it onto a transmission line 14 (such as telephone network or data network). Although the modified READ coding system is well known, it will be given in brief for a better understanding of the invention. In this coding system, density (black and white) changing positions on each horizontal scanning line of a picture are successively two dimensionally coded, referring to the code signal on the preceeding scanning line. The reference to the preceeding scanning line is ceased at every K scanning lines, and at these times the density changing positions on the picture are one dimensionally coded. An EOL code is allocated to the end of the code signal of each scanning line. The last bit of the EOL code is "1" when the succeeding scanning line is one dimensionally coded, and is "0" when it is two dimensionally coded. Using the logic level of the last bit of the EOL code, the decoding side can decide whether the code signal of each scanning line is one or two dimensionally decoded. In this embodiment, a K factor in the modified READ coding is supplied from a K factor generator 16. The K factor generator 16 calculates by an operation later described, a K factor to provide the highest reduction rate according to a transmission error rate R of the transmission line 14. The K factor thus obtained is supplied to the two dimensional coder 12. The error rate R may manually be input to this apparatus. Alternatively, it may be automatically set according to the type of the transmission line connected, such as a telephone or a data network. In the general type telephone network, the error rate R depends on distance. In this case, it may be automatically set depending on the subscriber's number.

The code signal transmitted through the transmission line 14 to the receiving facsimile, is fed to a two dimensional decoder 18 where it is decoded into the original image signal. The decoded image signal is stored in an image memory 20, and then visualized on paper by an image forming section (not shown). Connected to the two dimensional decoder 18 is an error detector 22 for detecting a code error which may occur during the transmission of the code signal. The error detection is performed on the basis of the number of picture elements contained in one scanning line. Specifically, the two dimensional decoder 18 counts the number of picture elements of each scanning line during the decoding of the transmitted signal. Upon detection of the last code EOL of each line, the result of the counting is supplied to the error detector 22. The error detector 22 compares the count with a reference number of picture elements according to the size of the document under transmission. When these are not equal to each other, the error detector 22 produces an error detection signal. The error detection signal is returned through the transmission line 14 to the transmitting facsimile and to a transmission controller 24. The transmission controller 24 controls the coding and transmission of the image signal, and controls the retransmission of the code signal including transmission error. When the entire image signal of a document has been transmitted, the transmission controller 24 again encodes and transmits any blocks of the image signal having the code error.

The details of the K factor generator 16 will now be described. In the facsimile shown in FIG. 1, when an error rate R of the transmission line 14 is low, the probability of retransmission is low. In this case, therefore, the reduction rate is high if the block size (K factor) is selected to be large. On the contrary, when the error rate R is high, the probability of the retransmission is high, and hence the reduction rate is high if the K factor is set at a small value.

How to obtain an optimum value of the K factor will now be described. The code length (the number of bits) when one scanning line is one dimensionally coded, or modified Huffman coded, is normalized to be 1. A code length when it is two dimensionally coded, or modified READ coded, it assumed to be P. Under this condition, a code length of a code signal of one block (K lines) output from the two dimensionally coder, is $1 \cdot 1 + P(K-1)$. As seen from this formula, when $K=1$, this value, or the code length of this signal, is 1. Therefore, this value is defined as a coding rate ratio of the coding rate of two dimensional coding to that of one dimensional coding. This coding rate ratio indicates how effectively the image signal is encoded, viz., how the code signal shortens the image signal is. A coding rate ratio $C_{PR}$ for each scanning line is given by:

$$C_{PR} = 1/K + P(1 - 1/K) \quad (1)$$
$$= 1/K(1 + PK - P)$$
$$= (1 - P)/K + P$$

P was experimentally determined to be 0.6 by the inventor. The coding rate ratio $C_{PR}$ (1 when $K=1$) can be mathematically described with the block size K in the following relation:

$$C_{PR} = a + b/K \quad (2)$$
$$= 0.6 + 0.4/K$$

Figure 2:
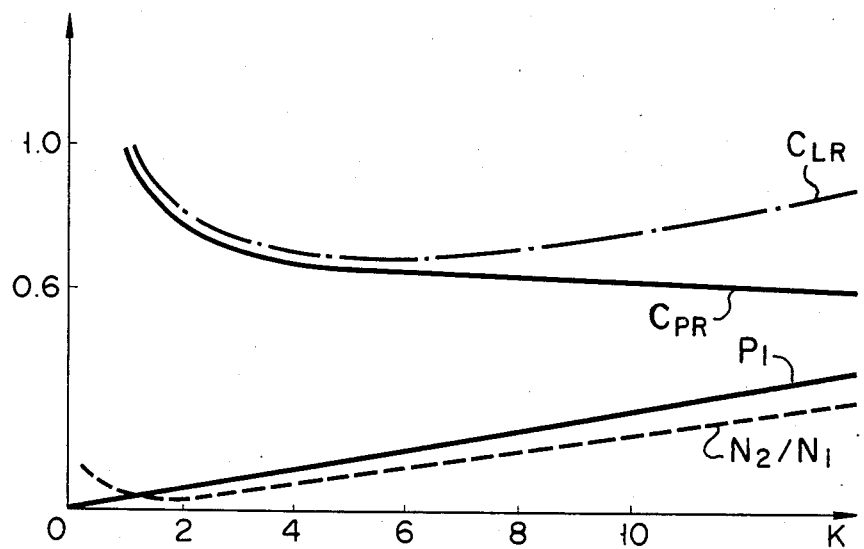
FIG. 2 shows the graph illustrating a relationship of K factor vs. redundancy reduction rate in the embodiment of FIG. 1.

This relation can be graphically expressed with as a continuous curve in FIG. 2. This graph teaches that, when the code error due to the transmission of the code signal is neglected, the larger K is, the higher the reduction rate of the two dimensional coding. The encoded length of the image signal may be as little as 60% of that in one dimensional coding.

A probability $P_1$ of error occurence in the code signals in one block (K lines) as transmitted is given by:

$$P_1 = KWC_PR \quad (3)$$

where R is an error rate of the transmission line, W is the length of the scanning line (the number of picture elements in a scanning line), and $C_P$ is a coding rate (code length/the number of picture elements). The probability $P_1$ also includes a retransmission rate. $P_1$ behaves rectilinearly as shown by a continuous line in FIG. 2.

Accordingly, the code length $N_1$ of the code signal retransmitted for each block is represented by:

$$N_1 = KWP_1 \quad (4)$$
$$= K^2W^2C_PR$$

The equation (4) may be rewritten into another relation for one line, where the number of scanning lines per document is L, and the retransmission code length $N_2$ for the entire document is given by:

$$N_2 = LN_1/K \quad (5)$$

-continued $$= K^2 W^2 C_P RL/K$$

$$= KW^2 C_P RL$$

The ratio of the code length increased due to the retransmission to that of the original one block varies as shown by a curve of broken line in FIG. 2, against K.

Even if no error occurs, the code length $N_3$ of one document is $LWC_P$. Therefore, the code length $C_L$ of the whole code signal including retransmission is given by:

$$C_L = N_2 + N_3 \quad (6)$$

$$= KW^2 C_P RL + LWC_P$$

$$= C_P LW(1 + KWR)$$

In the equation (6), L and W are constants, and may be deleted. Then, the coding rate ratio of the two dimensional coding for the entire document, in which the retransmission is considered, is as follows:

$$C_{LR} = C_{PR}(1 + KWR) \quad (7)$$

$$= (a + b/K)(1 + KWR)$$

Equation (7) can be graphically depicted as indicated by the one-dot-chain curve in FIG. 2.

To obtain the block size K with the best coding rate ratio, the equation (7) is differentiated as follows:

$$dC_{LR}/dK = WR(a + b/K) + (1 + KWR)(-b/K^2) \quad (8)$$

$$= aWR - b/K^2$$

To find an optimum K factor, the right side of the equation (8) is set to zero.

$$aWR = b/K^2 \quad (9)$$

$$K = \sqrt{(b/a)WR}$$

$$= \sqrt{(\tfrac{b}{a})WR}$$

Equation (9) teaches that the K factor which provides the highest redundancy reduction rate in the modified READ coding is determined by only the error rate R of the transmission line 14 and the width W of the document (the number of picture elements in one scanning line). In equation (9), the document width W can be treated as a constant. Accordingly, in the circuit operation, when receiving an error rate R of the transmission line 14, the K factor generator 16 calculates a K factor using equation (9), and supplies the K factor to the two dimensional coder 12. Alternatively, the K factors for given widths W and error rates R can be previously calculated, and stored in a ROM memory, for example,. In use, a necessary K factor is read out of the memory according to the width W and the error rate R at that time. The results of the calculation of the equation (9) are tabulated below.

TABLE

| Error rate R | Block size (K factor) Width W (number of picture elements) | | |
|---|---|---|---|
| | 1216 A5 (8/mm) A7 (16/mm) | 1728 A4 (8/mm) A6 (16/mm) | 2432 A3 (8/mm) A5 (16/mm) |
| $10^{-4}$ | 2 | 2 | 2 |
| $10^{-6}$ | 23 | 20 | 17 |
| $10^{-8}$ | 234 | 196 | 165 |
| $10^{-10}$ | 2342 | 1965 | 1655 |

Figure 3:
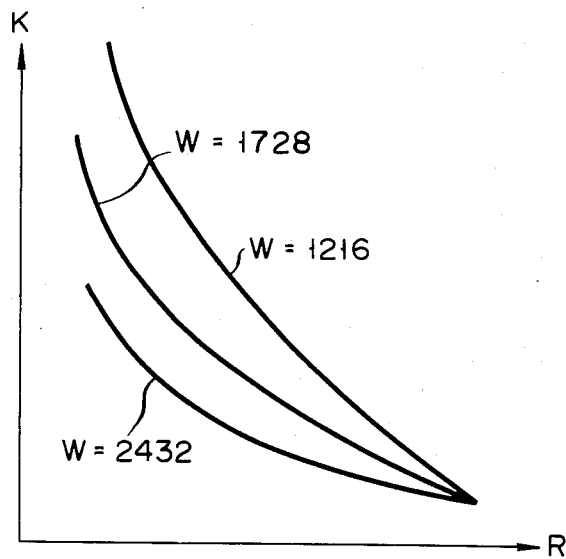
FIG. 3 shows a graph illustrating K factor vs. error rate in the FIG. 1 embodiment.

In the above table, "8/mm" means a horizontal resolution of 8 picture elements for a 1 mm interval. The contents of the table can be graphed as shown in FIG. 3.

As seen from the foregoing description, according to the first embodiment, an optimum K factor considering increase in code length caused by retransmission of error can be automatically obtained according to an error rate R of the transmission line, and the image signal can be encoded with the highest redundancy reduction rate.

Figure 4:
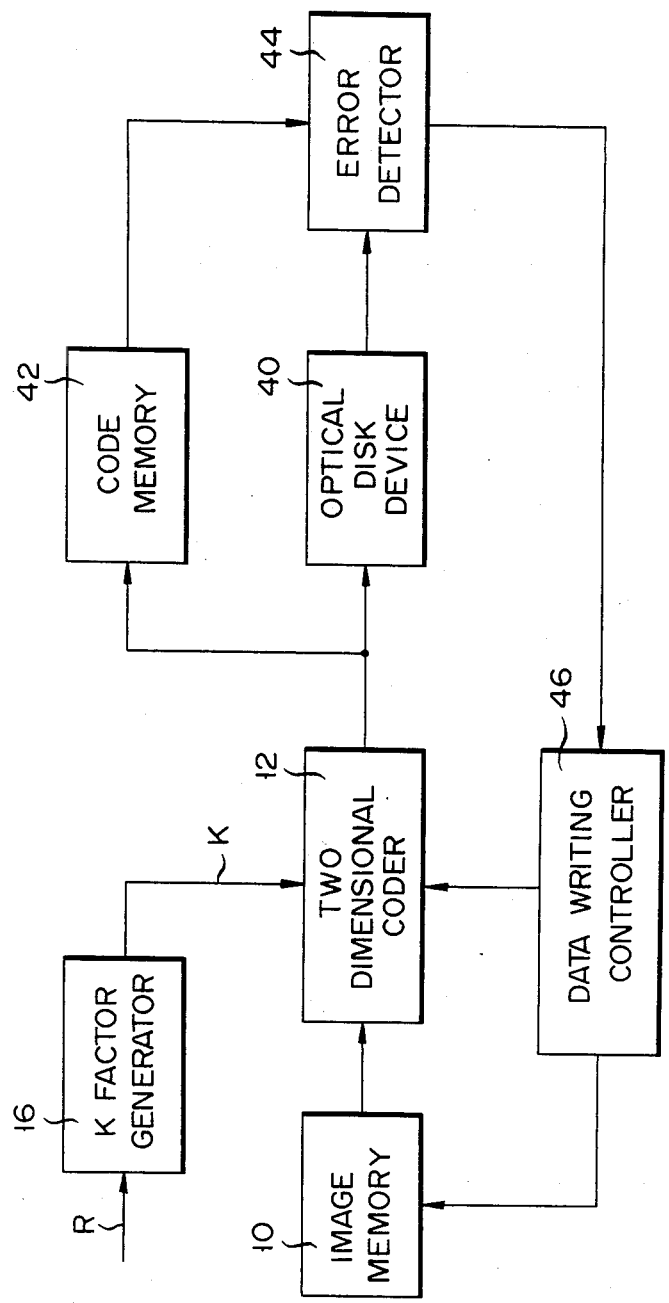
FIG. 4 is a block diagram of a second embodiment of a two dimensional coding apparatus according to the present invention, in which the apparatus is being used with an image signal filing system.

A second embodiment of a two dimensional coding apparatus according to the present invention will now be described, referring to FIG. 4. In the second embodiment, the two dimensional coding apparatus is being used with an image signal filing system. The same reference numerals are used for the same components in FIG. 1. As in the first embodiment, the image signal read out from image memory 10 is supplied to two dimensional coder 12, and in coder 12, it is modified READ coded using the K factor from K factor generator 16. Subsequently, unlike the first embodiment, a code signal output from the two dimensional coder 12 is supplied to an optical disk device 40. Then, the codes are written into an optical disk (not shown) in the form of a train of pits and nonpits, for example.

The codes are also stored in code memory 42. The code read out of the optical disk device 40 is supplied to an error detector 44 for detecting an error code which may occur when the codes are written into the optical disk. The code read out from optical disk device 40 is also supplied to error detector 44. From the optical disk into which the code writing is completed, the code is immediately read out, and supplied to error detector 44. The error detector 44 compares the reproduced code with the code read out from code memory 42, and produces an error detection signal when these are not equal to each other. The error detection signal is returned to the record side, and to the data writing controller 46. The data writing controller 46 controls the rewriting of the code with the writing error as well as the writing of the image signal. Upon completion of writing of the image signal for one sheet of document, the data writing controller 46 again encodes and writes any blocks of the image signal including error.

The error rate R of the transmission line 14 in the first embodiment may be replaced by a writing error rate of the optical disk. Also in the second embodiment, the code length of the whole writing including rewriting, can be minimized, thus leading to improvement in the redundancy reduction rate of the two dimensional coding apparatus.

As described above, according to the present invention a two dimensional coding apparatus can reduce the amount of information processed by setting the K factor at the highest redundancy reduction rate considering the increase of the code length caused by retransmission or rewriting of the error block according to an error rate of the transmission line or the recording medium.

It should be understood that the present invention is not limited to the above-mentioned embodiments, but these embodiments may be changed and modified and still fall within the scope of the invention. For example, in the second embodiment, for write error detection, the codes are compared with each other. Alternatively, the code read out of the optical disk device 40 is decoded and compared with the image signal output from the image memory 10. In this case, the code memory is unnecessary. While the modified READ coding system was employed for the two dimensional coding system in the above-mentioned embodiments, any other coding system varying the block size may be used.

What is claimed is:

1. A two dimensional coding apparatus comprising:
   means for coding an image signal corresponding to the signal of a scanned line and producing therefrom a code signal, said coding means normally performing two-dimensional coding with respect to each scanning line but performing one-dimensional coding every K scanning lines, wherein K scanning lines constitutes one block;
   code processing means, connected to said coding means, for transmitting or storing said code signal from said coding means;
   error detection means, connected to said code processing means, for detecting an error code in the code signal occurring during transmission or storing by said code processing means and producing an output therefrom;
   means for controlling the retransmission or restoring of a code signal having said error code according to the output of said error detection means and connected to said coding means;
   means for receiving an inputted error rate of said code processing means; and
   means, connected to said receiving means, for selecting the number K, said selecting means selecting the number K according to said inputted error rate and supplying a signal representing the number K to said coding means.

2. An apparatus according to claim 1, in which said number K selecting means selects the number K so as to minimize the amount of transmitted or stored code signal and retransmitted or restored code signal.

3. An apparatus according to claim 1, in which said coding means encodes said image signal using a modified READ coding system.

4. An apparatus according to claim 3, in which said error detection means detects said error code depending on whether or not the number of picture elements represented by codes on each scanning line is equal to a predetermined number of picture elements.

5. An apparatus according to claim 1, in which said control means controls the retransmission or restoring of code signal for each block having said error code.

6. An apparatus according to claim 1, in which said code processing means includes a signal transmission line connected to a decoder.

7. An apparatus according to claim 1, in which said code processing means includes recording means for recording the code signal.

8. An apparatus according to claim 7, in which said error detecting means includes a code memory for storing said code signal, and a comparator for comparing the code signal read out from said recording means with the code signal read out from said code memory.

* * * * *